United States Patent
Andre et al.

(10) Patent No.: US 7,350,043 B2
(45) Date of Patent: Mar. 25, 2008

(54) CONTINUOUS DATA PROTECTION OF BLOCK-LEVEL VOLUMES

(75) Inventors: Jeffrey A. Andre, Denver, CO (US); Patrick J. Tomsula, Arvada, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 205 days.

(21) Appl. No.: 11/351,385

(22) Filed: Feb. 10, 2006

(65) Prior Publication Data

US 2007/0220309 A1    Sep. 20, 2007

(51) Int. Cl.
*G06F 12/00* (2006.01)
(52) U.S. Cl. .................................... 711/162
(58) Field of Classification Search ............ 711/114, 711/161, 162; 707/204; 714/6
See application file for complete search history.

(56) References Cited

U.S. PATENT DOCUMENTS

| | | |
|---|---|---|
| 6,324,654 B1 | 11/2001 | Wahl et al. |
| 6,463,501 B1 * | 10/2002 | Kern et al. ............ 711/100 |
| 7,003,706 B2 * | 2/2006 | McBride et al. ........ 714/719 |
| 2005/0028022 A1 | 2/2005 | Amano |
| 2005/0171979 A1 | 8/2005 | Stager et al. |
| 2005/0188258 A1 | 8/2005 | Stager et al. |
| 2005/0193244 A1 | 9/2005 | Stager et al. |
| 2005/0216788 A1 | 9/2005 | Mani-Meitav et al. |
| 2005/0240584 A1 | 10/2005 | Patterson et al. |
| 2006/0018505 A1 | 1/2006 | Cherian et al. |
| 2006/0041715 A1 | 2/2006 | Ulrich et al. |

* cited by examiner

*Primary Examiner*—Hiep T. Nguyen
(74) *Attorney, Agent, or Firm*—Kent A. Lembke; William J. Kubida; Hogan & Hartson LLP (57) ABSTRACT

A continuous data protection system, and associated method, for point-in-time data recovery. The system includes a consistency group of data volumes. A support processor manages a journal of changes to the set of volumes and stores meta-data for the volumes. A storage processor processes write requests by: determining if the write request is for a data volume in the consistency group; notifying the support processor of the write request including providing data volume meta-data; and storing modifications to the data volume in a journal. The support processor receives a data restoration request including identification of the consistency group and a time for data restoration. The support processor uses the data volume meta-data to reconstruct a logical block map of the data volume at the requested time and directs the storage processor to make a copy of the data volume and map changed blocks from the journal into the copy.

19 Claims, 6 Drawing Sheets

CONTINUOUS DATA PROTECTION OF BLOCK-LEVEL VOLUMES

BACKGROUND OF THE INVENTION

1. Field of the Invention

The present invention relates, in general, to data storage and back-up solutions for recovering data existing at a particular point in time, such as after a system crash, and, more particularly, to software, hardware and systems, and methods for providing continuous data protection in a manner that allows a user or customer to obtain a copy of information or stored data from a selected point of time.

2. Relevant Background

In the data storage industries, the need for effective and reliable backup and archive of data or information is well known. Today's businesses and other institutions are devoting a significant amount of time and money toward information system (IS) resources that are devoted to providing backup and archive of information resident in computers and servers within their organizations that produce and rely upon digital information. The customers of the data storage industry are more frequently demanding that not only is their data properly backed up but also that when needed, such as after a system failure that causes a loss of data, that the backed up data be accessible at a particular point in time. In other words, there is an increasing demand for continuous data protection that allows data to be restored back to its state at a particular moment in time, which is most commonly a point in time just before their computer or data storage system crashed or was lost. The demand for continuous data protection, though, must also be balanced against the demand for low data storage costs and for speed in processing data.

Today, the term "backup" generally means that periodically, such as each day, a backup record is made that mirrors then-present information in active memory and storage of a computer or computer server. This backup operation usually involves a transfer of data to disk storage, such as to a redundant array of inexpensive disks (RAID) system, and/or to magnetic tape. The backup operation often occurs during a period of likely minimum usage of the active memory and/or data storage (or data storage resources), such as in the middle of the night. If the storage resource is thereafter lost or becomes unavailable on account of equipment failure, or for any other reason (e.g., a virus strikes at noon or a personnel error causes a crash), it is then possible to use the backup record to reconstruct the state of the information in storage as of the last backup time and date.

For many users, it is unacceptable to not be able to go back to a time immediately before the loss of the storage resource, which may mean the loss of a days or at least several hours of stored data changes (e.g., want to go back to a minute or even seconds before the virus hit or personnel mistake occurred). Unfortunately, only a limited number of alternatives have been available to the common point-in-time backup method for protecting data. Some of the solutions directed to providing continuous data protection (or "CDP") have been very complex and have required significant software and/or hardware modifications to existing systems. This has generally resulted in customers refusing to implement such CDP solutions as being too expensive or complex, host specific, or processor hungry, and instead, these users go forward relying on existing periodic backup possibly with more frequent point-in-time backups of their data as the only improvement.

As a result, existing backup solutions including existing CDP techniques do not meet the needs of data storage customers, and there is a continuing need for enhanced techniques for providing continuous or near continuous data protection. Such techniques preferably can be implemented using existing data storage hardware with only limited increases in their operating complexities, with minimal changes in their processing speeds, and at costs that are more acceptable to data storage users.

SUMMARY OF THE INVENTION

The present invention addresses the above problems by providing a method (and corresponding software and hardware components) for providing continuous data protection (CDP) in a computer system with data storage resources. This is generally achieved through a combination of hardware and software components. When the method is implemented in a system, the user (or customer) has a mechanism to recover their information at any point in time with minimal cost and, typically, no loss of performance. Use of the CDP method of the invention also spreads cost of the backups of data over the lifetime of the information. Briefly, the CDP method involves providing an indication on a data volume that the information on the volume is to be continuously protected. As part of the method, changed information in the CDP-marked volume is prestaged to cache memory. Then, a storage or support processor (such as a RAID processor implemented as an ASIC or the like) reliably time stamps and journals all changes to block-level volumes having the CDP indications by interacting with a meta-data management system.

As will become clear, the CDP method of the invention acts at higher speeds and is a simpler implementation from the user's perspective. It also provides a much simpler mechanism (when compared with prior CDP techniques) to provide continuous data protection of a user's or customer's information while requiring no changes to any host systems that may be accessing a storage controller on which the CDP method is implemented.

More particularly, a continuous data protection system is provided for facilitating point-in-time data recovery. The system includes a data storage resource with a consistency group including a set of volumes, with each volume marked with an attribute indicating membership in the consistency group. A support processor is included for managing a journal of changes to the set of volumes and storing/managing meta-data for the volumes. The system also includes a storage processor that is communicatively linked to the data storage resource and to the support processor. The storage processor (which may be a RAID or similar storage processor) processes write requests by: (a) determining if the write request is for a data volume with the attribute that indicates membership in the set of volumes in the consistency group; (b) when determined to be in the set, notifying the support processor of the write request including providing meta-data for the data volume; (c) storing prior data from the data volume associated with the write request location in a data protection journal; and (d) scheduling the write request for execution in the data storage resource such as in back-end drives. The meta-data for the data volume that is passed to the support processor typically includes identification of the data volume and the logical block address of the modified block(s) of the data volume.

During operation of the system, the support processor receives a data restoration request including identification of the consistency group and a time for data restoration. In response, the support processor uses information in the data restoration request and the meta-data related to the data volume to reconstruct a logical block map of the data volume at the data restoration time. The support processor directs the storage processor to make a snapshot copy of the data volume and to map changed blocks from the data protection journal into the snapshot copy using the logical block map. To support time synchronization between a requesting host or other restoration initiator, the system includes a Real-Time-Clock (RTC) that provides the storage processor with a reference clock value based on a standard epoch and wherein the data restoration request includes a current time as an initiator of the data restoration request with respect to the standard epoch. Of course, the system may include an additional storage processor and support processor each acting to maintain the consistency group, and in such an embodiment, the support processors exchange synchronization messages over a communication facility at preset time intervals to establish recovery points for the set of volumes in the consistency group.

DETAILED DESCRIPTION OF THE PREFERRED EMBODIMENTS

The present invention is directed to methods and systems for providing continuous data protection or CDP in a manner that allows a user or customer (e.g., an operator of a host) to select a point-in-time recovery of backed up data and, more specifically, CDP marked volumes and/or data. The method is typically implemented with software in storage processors (e.g., RAID processors or the like) and in a support processor in a storage controller or similar device or assembly. The following description will describe the CDP method that can be used to continuously protect a customer's data inside a storage controller that is operating to provide a host access to data storage, i.e., is providing SCSI block device volumes or other data volumes. The description of the method and systems used to implement such a method details the interaction between the customer (e.g., what input and control an operator may have including indicating which volumes should have CDP and which volumes should be grouped into which contingency groups (CGs)), the initiating by a host processor, and the operations that occur within a storage controller configured according to the present invention. From this description, it will be clear how the invention provides a mechanism to restore a volume or set of volumes to a specified point-in-time, and how this can be done without requiring that the storage controller's clock be synchronized to a host or customer system.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk devices that implement RAID storage techniques and that may use SCSI and other I/O, data transfer, and storage protocols but the invention is not intended to be limited to the exemplary embodiments shown herein as it is useful for nearly any data storage arrangement in which data volumes are generated and maintained and are written to by write operations (as will be clear to those skilled in the art). The storage controllers described herein may take many forms and typically are shown to include a RAID processor, an alternate RAID processor, and a support processor, but, of course, the RAID processors may be thought of more generally as storage processors useful for performing the functions described herein. Further, the description typically shows devices such as the RAID processors, support processors, and associated memory and/or cache as having a location (such as within a single housing or box) but the physical location is not limiting with the functionality of the components and their ability to communicate being the more important aspects.

Prior to discussing particular embodiments of the invention, it may be useful to discuss more generally some of the components that are used to describe the CDP method of the invention. A volume is a block storage device that is declared by a user or customer via a host or user system to have specific RAID characteristics or levels (e.g., 0, 5, 6, 0+1, or the like). The volume is created on a number of block-level physical disk drives in a controller back-end storage pool that implements the RAID requirements. The volume is presented to the user or customer (or a host) in the terms of the SCSI protocol as a SCSI Logical Unit, typically referred to as a LUN. The LUN is associated with at least one SCSI target on a storage controller, and more than one LUN may be associated with a single target. A storage controller is a group of RAID storage processors that implement the functionality necessary to define and implement customer volumes.

According to one aspect of the invention, a consistency group may be defined by a customer or user (such as via a user interface in a user system or via a host). A consistency group (or CG) is a collection of volumes that are logically bound together (or grouped). When the continuous data protection (CDP) feature of the invention is exercised all the volumes within the CG are restored together. The CG may extend across a number of storage controllers. If the CG extends across more than one storage controller, then there preferably is provided an inter-controller communication facility between the controllers to facilitate either in-band or out-of-band communication between the controllers (such as to allow the support processors implementing CDP management functions to talk).

In the storage controller, the RAID processor provides the mechanism to process SCSI I/O commands addressed to one or more volumes. The RAID processor generates the necessary disk I/O operations to affect the intent of the I/O command on the physical drives comprising the volume.

The RAID storage processor uses cache memory to stage its I/O operations to and from the physical drives. The contents of this cache are protected against a power failure. A cache slot is used by the RAID storage processor to buffer I/O operations. Any changes to a cache slot are mirrored to the cache of the alternate RAID storage processor. A Real-Time-Clock (RTC) provides the RAID storage processors in the storage controller with a reference clock value, e.g., based on a standard epoch. A support processor is provided in a storage controller that manages the meta-data associated with the volume and directs the RAID or storage processor (s).

Figure 1:
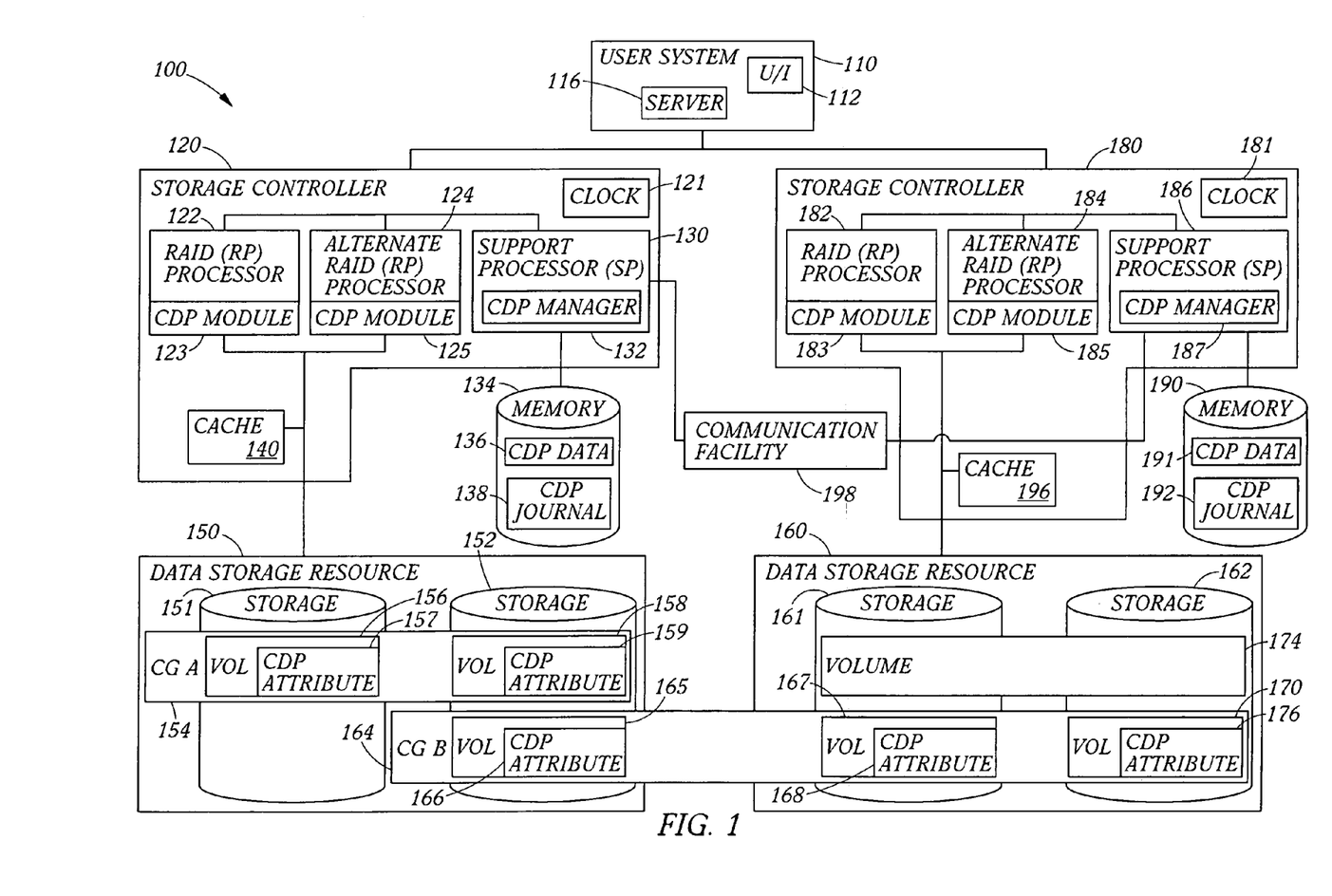
FIG. 1 illustrates in block diagram form a continuous data protection (CDP) system according to one embodiment of the invention.

With this terminology in mind, FIG. 1 illustrates a relatively simple CDP system 100 according to the invention. As shown, the CDP system 100 includes a user system 110 that includes a user interface 112 that enables a user or customer to provide input. As will be discussed, a user may act to define one or more consistency groups 154, 164, may assign volumes to such CGs 154, 164 (such as by marking created volumes with a CDP attribute), and may provide other input defining the CDP functionality (such as its granularity, CG size, and the like). A server 116 is provided in the system 110 and communicates (such as by requesting read or write operations to stored data) with a pair of storage controllers 120, 180 (but, it should be remembered that the invention may be implemented with one storage controller or with more than two).

Each storage controller 120, 180 is similarly configured with an RTC 121, 181 that provides a reference clock value, with the RTCs 121, 181 being kept synchronized. Each storage controller also includes a pair of RAID processors 122, 124, 182, 184 each running a CDP module 123, 125, 183, 185 and includes a support processor 130, 186 running a CDP manager 132, 187. The CDP modules 123, 125, 183, 185 and CDP managers 132, 187 are typically software (and/or hardware) that enables the processors to perform the CDP functions of the invention (as discussed above and in more detail below with reference to FIGS. 3-5). A cache 140, 196 is shown associated with each storage controller 120, 180 and is more generally made available to each RAID processor for buffering write operations. A communication facility 198 is provided to allow SPs 130, 186 to communicate such that consistency groups may be implemented across storage controllers 120, 180 such as CG 164 shown in FIG. 1 and such implementation typically includes the transmission of periodic synchronization messages between the SPs 130, 186.

Further, as shown, memory 134, 190 is provided for each of the support processors 130, 190 (and may be provided separately as shown or as part of the data storage resources 150, 160). The CDP managers 132, 187 act to store CDP data 136, 191 that facilitates the CDP method of the invention including volume meta-data and token information as described below as well as user input defining CGs and other CDP-related information. Additionally, the CDP managers 132, 187 act to store CDP prior data in the form of a journal 138, 192 either in memory 134, 190 or within local or remote data storage resources 150, 160 to enable recovery to a particular point-in-time.

Data storage resources, such as a plurality of disk drives that may use to provide RAID or other storage, 150, 160 are controlled by storage controllers 120, 180 in system 100. The resources 150,160 may take many forms and have varying size to practice the invention and are shown in simplified form to include storage components 151, 152, 161, 162. Volumes 156, 158, 165, 167, 170, and 174 are created on these storage devices (e.g., drives). As shown, CDP attributes 157, 159, 166, 168, 176 are assigned to (or specified for) a number of the volumes, and these attributes are assigned at or after volume creation so as to assign the volumes to particular contingency groups 154 and 164. Note, a consistency group may also be contained within a single storage device 151, 152, 161, 162 as long as it contains all volumes that belong to that group 154, 164. Note, also, that not all volumes need to be assigned to a consistency group to practice the invention, e.g., volume 174 is not being provided CDP protection and may be only recoverable under different data protection criteria (such as periodic backup or the like).

Figure 2:
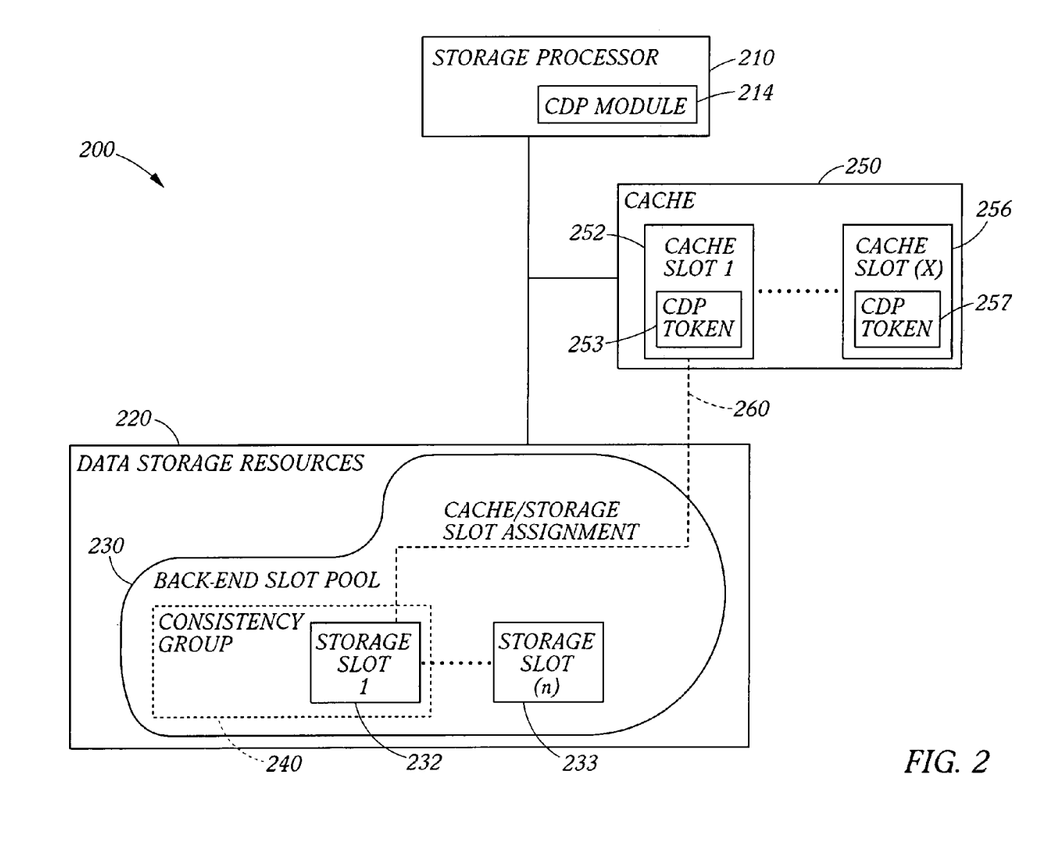
FIG. 2 illustrates a portion of CDP system showing the creation and use of a back-end slot pool to manage contingency groups.

To further explain features of the invention, FIG. 2 illustrates an even more simplified version of a CDP system 200. In this system 200, a single storage processor (such as one of the RAID processors in system 100) 210 is provided and is running a CDP module 214. A cache 250 is made available to the storage processor 210 and the cache 250 includes a plurality of cache slots 252 to 256. The storage processor 210 controls or manages data storage resources (e.g., a plurality of disk drives). According to one aspect of the invention, the storage processor 210 (or another component) may establish an available back-end slot pool 230 within the resources 220. This pool 230 includes a number of storage slots 232 to 233. Then, during operation of the system 200 to provide CDP, one or more of the storage slots 232 may be assigned or allotted to a consistency group (CG) 240. When a cache slot 252 or 256 is assigned (as shown at 260) a storage slot 232, a unique CDP token 253 or 257 is also assigned to the cache slot or is associated with such slot to facilitate CDP operations, as is explained with reference to FIGS. 3-5.

Figure 3:
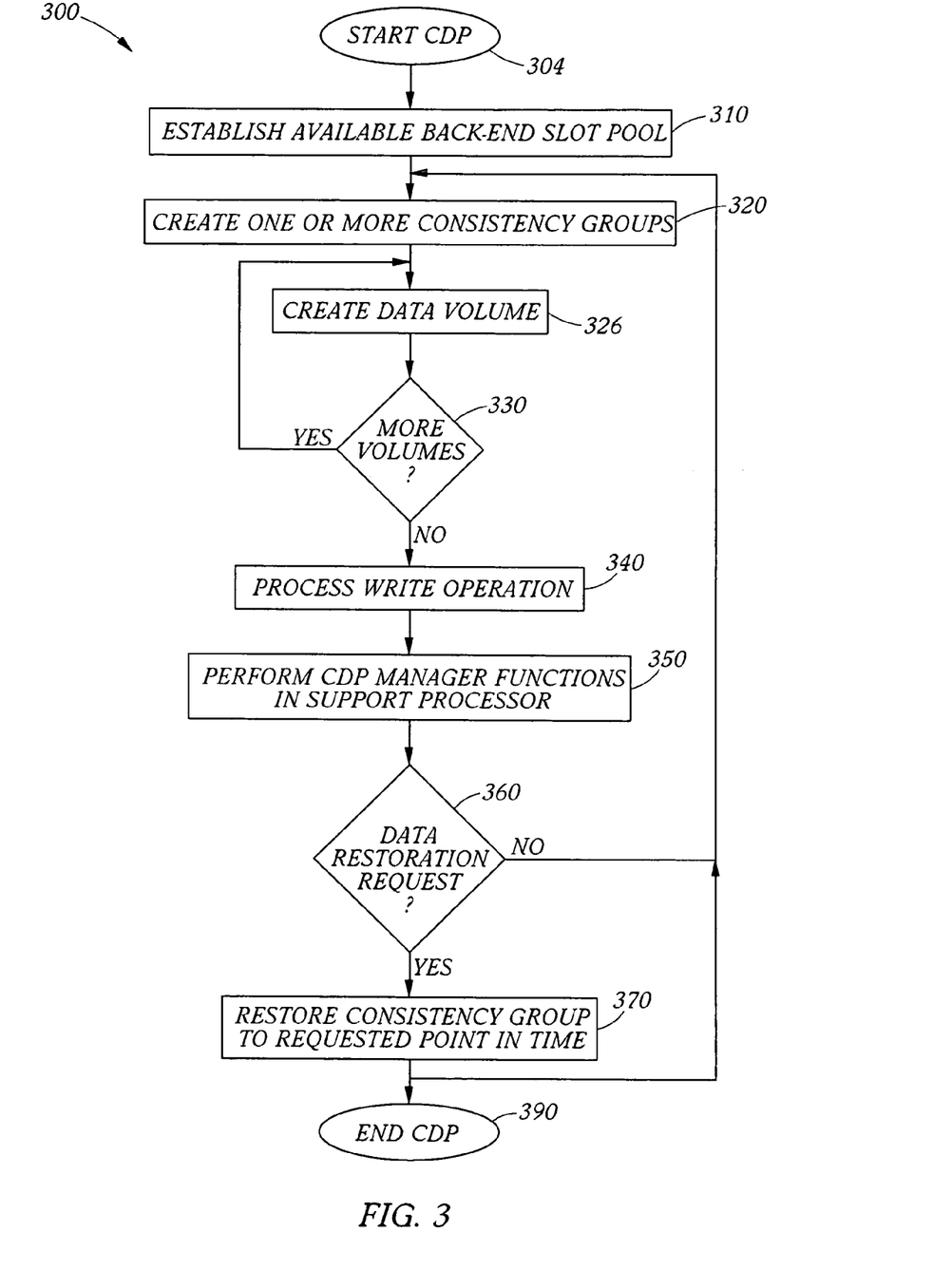
FIG. 3 is an exemplary continuous data protection process such as may be implemented by operation of the systems shown in FIGS. 1 and 2.

An exemplary continuous data protection (CDP) method 300 is shown in FIG. 3. The method 300 begins at 304 such as with the loading of CDP modules on RAID or other storage processors and providing a support processor with CDP management in a storage controller containing the RAID processors. Further, at this point, communication connections (in-band or out-of-band) may be provided between storage controllers to enable support processors to perform synchronization operations. Additionally, at 304, data resources such as disk drives may be made available to one or more storage controllers.

At 310, the method 300 continues with establishing one or more available back-end slot pools. Typically, this occurs when a RAID processor is initialized. The RAID processor acts to provide a pool of back-end storage slots that can be used later during asynchronous write operations. This slot pool may be subdivided during the process 300 to assign a subset of the pool to a particular consistency group.

According to another feature of the inventive method 300, at 320, one or more consistency groups are created. Step 320 typically involves a customer defining, such as via a U/I or via a host, a consistency group across one or more storage controllers. When the consistency group is created, the customer/operator may in some embodiments be able to define a level of granularity to be used by each created consistency group while in other embodiments a default granularity is used. The granularity defines the resolution of the continuous data protection. An upper bound on the amount of storage used by each consistency group per storage controller is also typically specified, with the upper bound being defined by the total number of back-end slots used for the deltas and may also provide a limit on the age of these slots. Further, the consistency group may also specify the back-end slot pool requirements to the storage or RAID processor. Consistency groups (or CGs) are defined as a collection of volumes with common or shared synchronization point guidelines. A synchronization point may be time based, journal utilization based (e.g., amount of storage in journal used since last synchronization point), controller based, host based, or a combination thereof. Data for the CG characteristics is typically maintained within the controller.

At 326, a next data volume is created in the CDP system (such as system 100 of FIG. 1), and at 330 it is determined whether there are more volumes to be created and if so, step 326 is repeated and if not, then the method moves to step 340. In step 326, when a customer/user creates a volume (such as via user system 110 in system 100), the current time value is retrieved from the RTC and that time stamp is saved in the meta-data associated with the volume (later as CDP data 136, 191). The customer may optionally indicate that the volume is to have continuous data protection by specifying which consistency group the volume should be assigned to or included in. This may be achieved by assigning a CDP attribute 157 as shown in FIG. 1 for volume 156 (but this attribute may also be assigned after volume creation). The volume may also be created so as to specify its back-end slot pool requirements to the storage or RAID processor.

At 340 the method 300 continues with processing a write operation. More detail of such processing shown in write operation processing 400 in FIG. 4, which starts at 406. At 410, a RAID storage processor receives a write operation request from a host for a volume. At 420, the RAID storage processor places the payload bound to the write operation into one or more cache slots in cache (i.e., buffers the write). At 430, the RAID storage processor determines whether the volume associated with the write operation is marked with continuous data protection (e.g., does it contain a CDP attribute?). If the volume associated with the write contains a CDP attribute, the method 400 continues at 440 with the RAID storage processor assigning a back-end slot from the previously established pool in the data resources to the cache slot. Additionally, a unique CDP token is assigned to the cache slot (or slots) in which the write operation has been pre-staged. The cache slot is immutable until it is cleared later by the support processor in the storage controller containing the RAID processor that is processing the write operation request. Additionally, the cache slot is typically mirrored on the alternate RAID storage processor.

Figure 4:
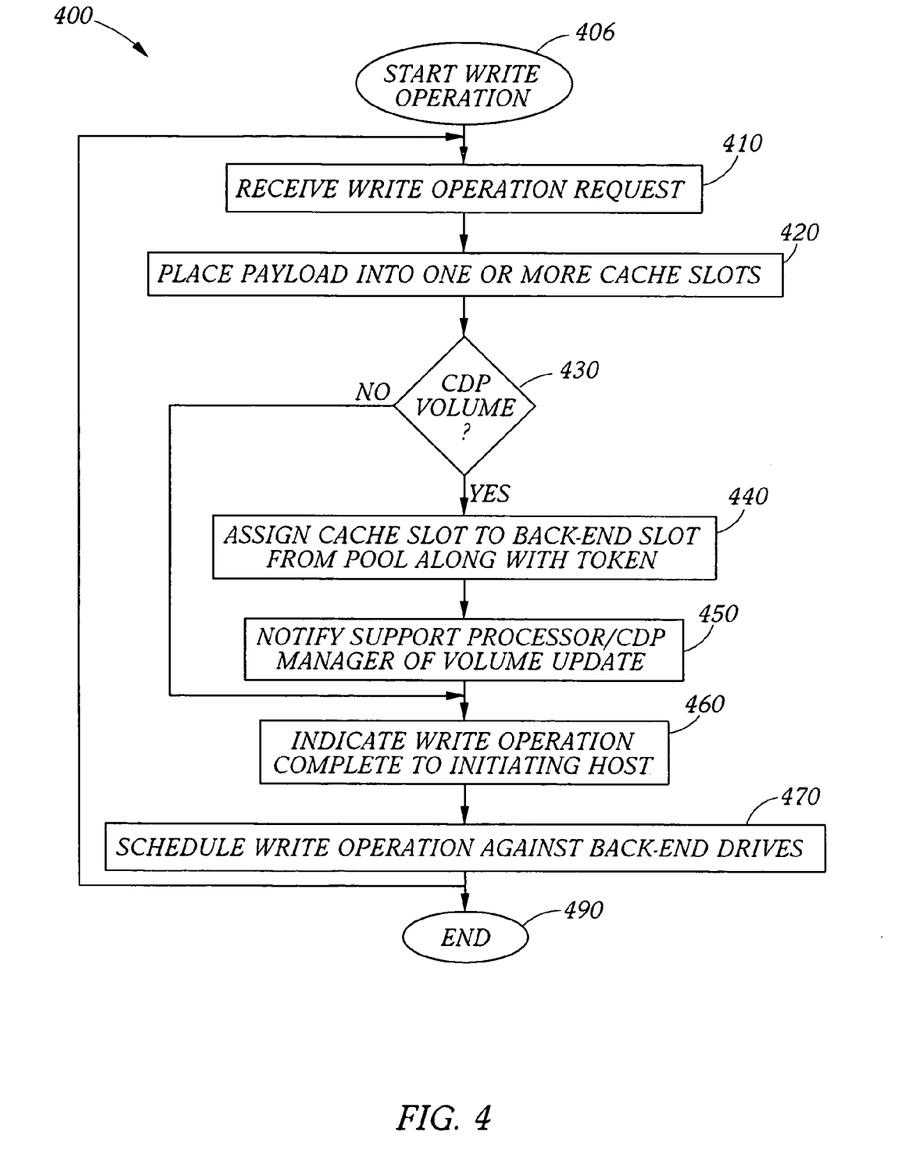
FIG. 4 is a method of processing a write operation such as with a RAID or other storage processor in one of the CDP systems of FIGS. 1 and 2.

At 450, the method continues with the support processor being notified by the RAID storage processor (e.g., the CDM manager of the support processor is contacted by the CDP module of the RAID processor) that a volume with a CDP attribute has been updated. Additionally, the unique CDP token associated with the back-end and cache slots is provided to the support processor for use in managing CDP activities. At 460, the method continues with the RAID processor indicating the write operation is complete to the initiating host. At 470, the RAID processor schedules necessary write operations against the back-end drives or resources. Further, the CDP maintains prior data from the target location (for writes affecting CDP marked volumes) in journal format (e.g., in journals maintained in memory by the support processor (and/or by the RAID processor) as shown in memory 134 as journal 138). The method 400 may now end at 490 or continue with receiving additional write operation requests at 410.

Figure 6:
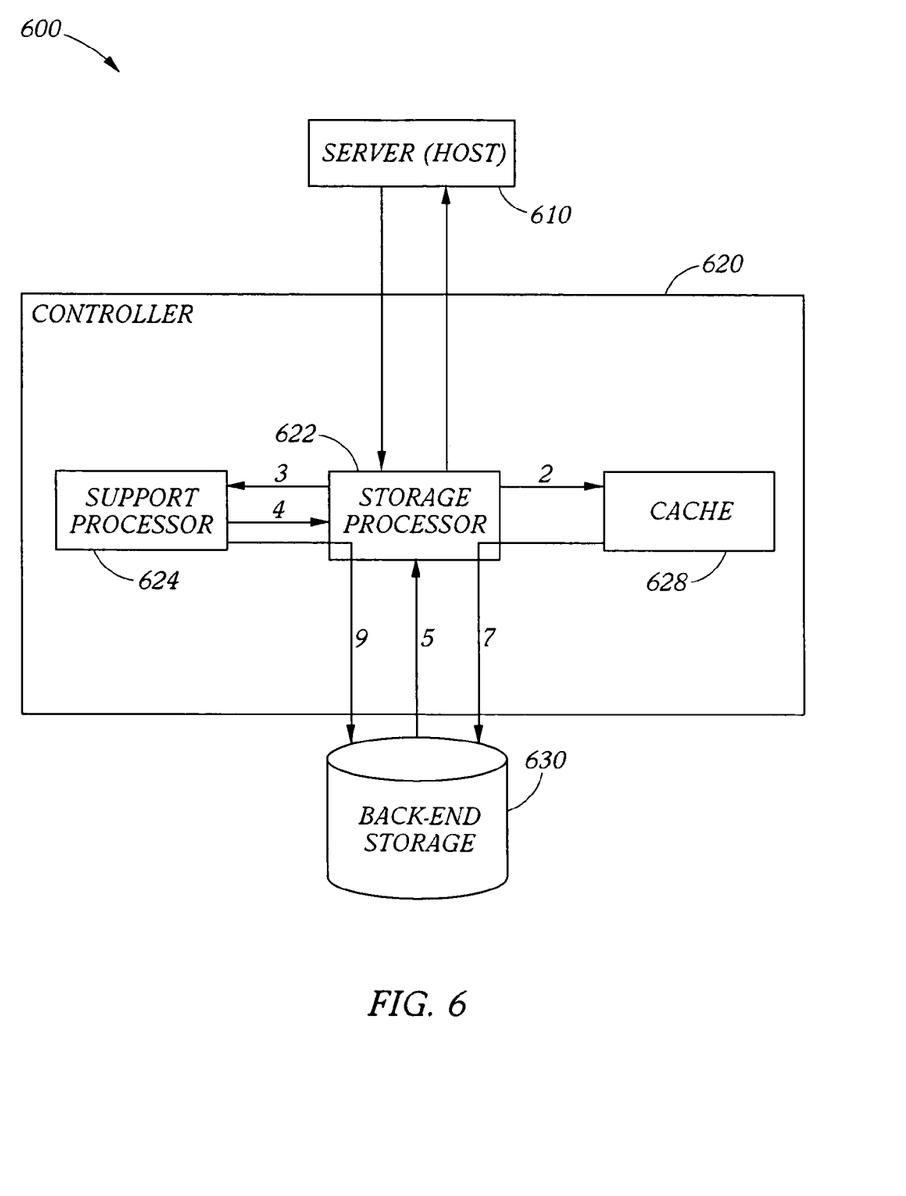
FIG. 6 is a simplified CDP system illustrating with flow arrows CDP processes of the present invention.

The method 300 then continues at 350 with performing CDP manager functions in the support processor associated with the RAID storage processor performing the write operations at 340 (but, of course, some of these CDP functions may be concurrently performed by the support processor). FIG. 6 illustrates in a more flow oriented-manner the operation of an exemplary CDP system 600 according to the invention (e.g., one that implements the processes 400 of FIG. 4). FIG. 6 is useful for illustrating data and signal flow in the CDP system 600 and for also clarifying that the customer data being updated, i.e., the "old" data is read and then, written to the journal. The system 600 includes a server 610, a controller 620 with a storage processor 622, a support processor 624, and cache 628, and back-end storage 630. As shown with numbered arrows, the flow in the system 600 includes at arrow 1 a write request sent by the server 610 to the controller's service processor 622. At arrow 2, the server's data is written to the cache 628 and if the target volume is part of a consistency group, it is assigned a token.

As shown at arrow 3, the support processor 624, is notified that a CDP volume was updated and is supplied the associated token. Then, at arrow 4, the support processor 624 assigns a slot for the original data and returns that the assignment to the storage processor 622. The storage processor 622 is shown at arrow 5 reading the "old" data from the back-end storage 630 into cache 628 destined for the new back-end location that was assigned in the step shown by arrow 4 (i.e., step 4). Arrow 6 is used to illustrate that the server 610 is notified by the storage processor 622 that the write is complete. Then with the customer updated, the "new" data is written to the back-end storage 630 as shown with arrow 7. The "old" data may then be destaged to the back-end storage 630 (such as in a step 8 not shown), and the seventh and eighth steps may be performed in parallel. As shown with arrow 9, the support processor 624 acts to update journals.

Figure 5:
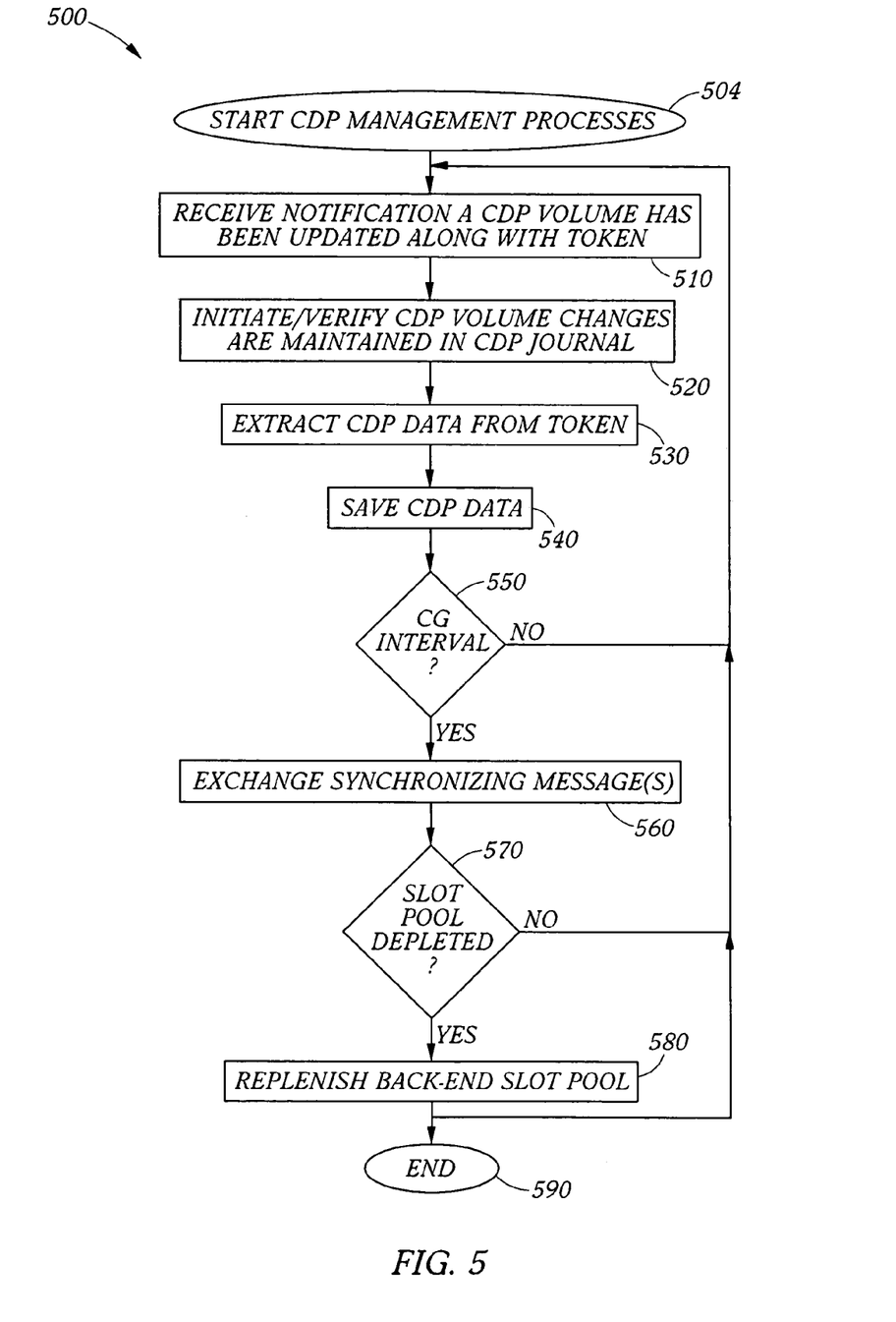
FIG. 5 illustrates exemplary CDP management processes such as those performed by operation of the support processors in the CDP system of FIG. 1.

An exemplary CDP management process 500 is shown in more detail in FIG. 5 and starts at 504. At 510, the support processor (or its CDP manager) receives notification that a CDP volume has been updated and along with such notification a unique token is also received for processing. The CDP manager of the support processor may at 520 verify or initiate maintenance of CDP writes of prior data in the CDP journal. Basic journal information such as the number, type, and location of journals is kept in the controller configuration database. There are typically at least two journals. First, a data journal is provided that is a sequential set of variable length records containing changed prior data and other information. Second, a smaller journal is provided that contains fixed length records. The second, smaller journal is generally a LBA offset index into the data block journal that is used as an aid in journal searches. There may be more journals depending on optimization of the implementation.

The data journal contains prior data changes to volume data and has the changed data buffer, its size and LBA, a time stamp or other synchronization point data, and a volume and CG identifier. The quick index or second smaller journal contains broad value synchronization points such as the controller synchronization points or journal usage synchronization points. This data includes the type of synchronization point, a time stamp, and the relative offset within the data journal where the first journal entry begins after this synchronization point. The journals are preferably self-describing and recoverable so that no single point of failure exists. The quick index (or synchronization point) journal may be recovered from the data journal as a background task. The data journal may be RAID protected or protected by creating multiple identical journals depending on user and/or implementation preferences.

As to restoration using the journals, the user requests a restoration to a given time synchronization point. After the copy of the volume(s) in the consistency group is made, the synchronization point journal is traversed to find the basic starting location within the journal of all changes since the requested time. The data journal is then searched for all changes in oldest to youngest direction. In parallel or sequentially, as changes are found, a bit map of CG changes is created so that only the earliest change is placed on the volume copy. The data is restored to the copy of the volumes at the proper location. It would be possible to present the volume immediately to the host/user and only hold up volume access for those tracks that need updating to older data when they are accessed by the user. In this case, the bit map of changes would have to be fully known prior to making the volume available for use.

At 530, the CDP manager of the support processor extracts CDP data from the token and saves it to memory. The token contains a variety of data useful for performing CDP (for restoring data to a point in time) including, for example, information regarding a CDP write operation, its logical block address, its size, and the newly-assigned back-end slot. The extracted token information is bound in the volume's meta-data, and at this point in the write operation process, the RAID processor acts to schedule the necessary write operations against the back-end drives. Upon completion of the write operations, the cache slots associated with the unique token are cleared.

At 550, the CDP manager of the support processor acts to determine whether the interval defined for the contingency group has expired or is satisfied and such interval analysis is performed for each consistency group (which may have the same or differing intervals). At or after the interval, the method 500 continues at 560 with support processors managing or implementing a particular contingency group exchanging synchronizing messages. This message is sent over the connecting communication facility and is used to establish the recovery points defined when the consistency group is created.

At 570, the support processor determines whether the slot pool is depleted and if not, the processing 500 continues at 510. If determined depleted or near depleted, the CDP manager at 580 acts to replenish the slot pool in the data resources with additional slots. This event (i.e., step 580) is typically triggered at 570 by the detection of reaching a low-water mark or minimum number of slots (which may be detected by the RAID storage processor or the support processor). The support processor operates to replenish the back-end slot pool by supplying unused slots or slots that have been reclaimed from consistency groups. The method 500 ends at 590 or may continue at 510.

Referring again to FIG. 3, the CDP process continues at 360 with waiting for a data restoration request, and if not received yet, continuing the CDP process at 320. When a data restoration request is received (such as from a host or user system), the method 300 continues at 370 with restoring the consistency group (i.e., the volumes within such group) to the point of time indicated in the request using the previously stored CDP data and the journal containing the CDP contents. The method 300 then ends at 390 or continues at step 320.

According to one important aspect of the invention, the CDP process allows a CDP enabled storage system to restore CDP marked data back to its state at a user-selected point-in-time (such as to a particular hour, minute, or even second just prior to a system crash or loss of active memory). When a customer or user needs a set of volumes, i.e., a set of volumes assigned to a particular consistency group, restored to a particular point-in-time, a request is sent to the support processor. Its CDP manager processes the request to determine: (1) the consistency group to be restored; (2) the time to which it is to be restored; and (3) the customer's current time with respect to the common epoch. The support processor uses the request and all of the volume's meta-data to reconstruct a logical block map at the user-specified restoration time.

To achieve restoration, the CDP journal may have a number of characteristics. For example, the CDP data in the journal may be saved in increments of the smallest of cache slots. Additional data is typically saved to represent time slices and volume utilization. Further, data in the CDP journal may be offloaded to another storage medium if CDP restore time frames are not an issue. Also, the CDP journal data may be compressed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for providing data protection, comprising:
  creating a consistency group comprising a set of data volumes;
  at a storage processor, receiving a write operation request for a data volume in a data storage resource;
  determining with the storage processor if the data volume is a member of the set of data volumes in the consistency group;
  when determined a member of the consistency group, operating the storage processor to provide notification to a support processor of the write operation request for the data volume, wherein the notification includes providing a token with information pertaining to the data volume;
  with the storage processor, scheduling the write operation request for the data volume in the data storage resource and storing the write operation request in a data protection journal; and
  responding to a data restoration request for the consistency group by restoring the data volume by first using the token information to construct with the support processor a logical block map of the volume and by applying the data protection journal to a current state of the data volume.

2. The method of claim 1, wherein the token information comprises identification of the data volume, a logical block address for a write block on the data volume, size of data written in the write block, meta-data for the data volume, and a back-end slot in the data storage resource assigned to the data volume.

3. The method of claim 2, wherein the data restoration request comprises a time for data restoration and wherein the support processor constructs logically a block map of the data volume at the requested data restoration time using the token information for the data volume.

4. The method of claim 3, wherein the responding to the data restoration request step comprises the storage processor copying contents of the data volume to form a snapshot copy and mapping changes reflected in the data protection journal as indicated by the logical block map for the requested data restoration time.

5. The method of claim 1, further comprising at a time interval defined for the consistency group exchanging a synchronization message comprising recovery points for the consistency group between the support processor and another support processor maintaining the consistency group.

6. The method of claim 1, further comprising initializing the storage processor including providing a pool of back-end storage slots, wherein the creating of the consistency group comprises assigning a subset of the storage slots in the pool to the consistency group, and further comprising the storage processor operating to buffer the write operation request to a cache slot, to assign the cache slot to one of the storage slots in the subset of the storage slots assigned to the consistency group, and to include the cache/back-end slot assignment in the token information.

7. A continuous data protection system for allowing data recovery at a user-specified point-in-time, comprising:
   a data storage resource with a consistency group defined therein comprising a set of volumes including an attribute indicating membership in the set;
   a support processor managing a journal of changed data to the set of volumes and meta-data for the volumes; and
   a storage processor linked to the data storage resource and the support processor, the storage processor processing write requests including:
      determining if the write request is for a data volume with the attribute indicating membership in the set of volumes in the consistency group;
      when determined in the set, notifying the support processor of the write request including providing meta-data for the data volume;
      storing modifications to the data volume associated with the write request in a data protection journal; and
      scheduling the write request for execution in the data storage resource.

8. The system of claim 7, wherein the meta-data for the data volume passed to the support processor includes identification of the data volume and the logical block address of the write.

9. The system of claim 7, wherein the support processor further operates to receive a data restoration request comprising identification of the consistency group and a time for data restoration and to use information in the data restoration request and the meta-data related to the data volume to reconstruct a logical block map of the data volume at the data restoration time.

10. The system of claim 9, wherein the support processor directs the storage processor to make a snapshot copy of the data volume and to map changed blocks from the data protection journal into the snapshot copy using the logical block map.

11. The system of claim 9, the system further comprising a Real-Time-Clock (RTC) providing the storage processor with a reference clock value based on a standard epoch and wherein the data restoration request includes a current time an initiator of the data restoration request with respect to the standard epoch.

12. The system of claim 7, further comprising an additional storage processor and support processor each acting to maintain the consistency group and wherein support processor and the additional support processor exchange synchronization messages at preset time intervals to establish recovery points for the set of volumes in the consistency group.

13. The system of claim 7, further comprising a cache with cache slots, wherein the data storage resource comprises a pool of back-end storage slots with a subset of the storage slots being assigned to the consistency group and wherein the storage processor processing of the write request further includes placing a payload bound to the write request into one of the cache slots, assigning one of the storage slots to the cache slot, and assigning the cache slot a data token including at least a portion of the meta-data for the data volume.

14. A method for continuous data protection, comprising:
   creating a data volume for management by a storage controller in a set of data storage drives, the data volume including an attribute defining membership of the data volume in a consistency group managed by a storage processor and a support processor; and
   processing a write operation for the data volume with the storage processor, the processing including buffering the write operation to cache, storing prior data associated with the write operation in a data protection journal, and notifying the support processor of the write operation to the data volume comprising providing meta-data for the data volume to the support processor.

15. The method of claim 14, further comprising with the support processor extracting the logical block address of the data volume and the size of the of the data volume from the write operation notification and storing the extracted information.

16. The method of claim 15, further comprising with the support processor receiving a request for data restoration including a time for restoration and an identification of the consistency group and further with the support processor generating a logical block map at the restoration time for the data volume based on the extracted information and the data volume meta-data.

17. The method of claim 16, further comprising with the support processor directing the storage processor to copy current contents of the data volume and then map changed blocks from the data protection journal based on the logical block map into the copy of the current contents to generate a restored data volume.

18. The method of claim 14, wherein a level of granularity for the consistency group is defined based on user input and wherein the attribute is assigned to the data volume based on user-input.

19. The method of claim 14, further comprising operating the support processor to synchronize the restoration time with reference clock values received by the storage processor and the support processor based on a standard epoch.

* * * * *